US012136098B2

(12) United States Patent
Keck et al.

(10) Patent No.: US 12,136,098 B2
(45) Date of Patent: Nov. 5, 2024

(54) ADAPTIVELY ENHANCING PROCUREMENT DATA

(71) Applicant: Coupa Software Incorporated, San Mateo, CA (US)

(72) Inventors: Micky G. Keck, Cincinnati, OH (US); Jeffrey T. Crowder, Morrow, OH (US); Sundaresan R. Kadayam, Cincinnati, OH (US); John M. Kitson, Cincinnati, OH (US); Mark W. Reed, Fort Thomas, KY (US)

(73) Assignee: Coupa Software Incorporated, San Mateo, CA (US)

( * ) Notice: Subject to any disclaimer, the term of this patent is extended or adjusted under 35 U.S.C. 154(b) by 328 days.

(21) Appl. No.: 17/377,817

(22) Filed: Jul. 16, 2021

(65) Prior Publication Data

US 2021/0342920 A1 Nov. 4, 2021

Related U.S. Application Data

(63) Continuation of application No. 16/408,380, filed on May 9, 2019, now abandoned.

(Continued)

(51) Int. Cl.
 *G06Q 30/0201* (2023.01)
 *G06F 16/2457* (2019.01)
 (Continued)

(52) U.S. Cl.
 CPC ... *G06Q 30/0201* (2013.01); *G06F 16/24578* (2019.01); *G06F 16/9535* (2019.01); *G06Q 30/0633* (2013.01)

(58) Field of Classification Search
 CPC ............ G06Q 10/063; G06Q 30/0601; G06Q 30/0633; G06Q 30/0201; G06Q 30/0643;
 (Continued)

(56) References Cited

U.S. PATENT DOCUMENTS

| | | | | |
|---|---|---|---|---|
| 5,974,396 | A | * 10/1999 | Anderson | .......... G06Q 30/0204 705/14.27 |
| 7,107,226 | B1 | 9/2006 | Cassidy | |

(Continued)

FOREIGN PATENT DOCUMENTS

WO 2015/176071 A2 11/2015

OTHER PUBLICATIONS

Borner, Katy, Chaomei Chen, and Kevin W. Boyack. "Visualizing knowledge domains." Annual review of information science and technology 37.1 (2003): 179-255. (Year: 2003).*

(Continued)

*Primary Examiner* — Charles Guiliano
*Assistant Examiner* — Letoria G Knight
(74) *Attorney, Agent, or Firm* — Baker Botts L.L.P.

(57) ABSTRACT

Embodiments disclosed herein may provide capabilities for multi-source data gathering, adaptive item cross referencing, data preparation and data extraction. These capabilities may allow the creation item master records which can provide richer information than available from any one discrete source. Additional functionality which may be provided in some embodiments could also include providing commodity based predictive pricing and/or a visual spend map.

14 Claims, 16 Drawing Sheets

Related U.S. Application Data

(60) Provisional application No. 62/670,470, filed on May 11, 2018.

(51) Int. Cl.
    *G06F 16/9535*     (2019.01)
    *G06Q 30/0601*     (2023.01)

(58) Field of Classification Search
    CPC ... G06Q 30/0224; G06F 16/285; G06F 16/35; G06F 16/355; G06F 18/2431; G06F 40/30; G06F 16/23; G06F 16/906; G06F 16/24578; G06F 18/23; G06F 3/0486; G06F 3/04817; G06F 40/20; G06F 16/9535; G06T 11/206
    USPC .................................................. 705/7.29
    See application file for complete search history.

(56) References Cited

U.S. PATENT DOCUMENTS

| | | | |
|---|---|---|---|
| 7,110,976 B2 * | 9/2006 | Heimermann | G06Q 40/04 705/37 |
| 7,165,036 B2 * | 1/2007 | Kruk | G06Q 10/06375 705/7.11 |
| 7,447,999 B1 * | 11/2008 | Robertson | G06F 3/048 715/848 |
| 9,613,086 B1 * | 4/2017 | Sherman | G06F 16/248 |
| 9,697,246 B1 * | 7/2017 | Romano | G06F 16/24578 |
| 10,127,575 B1 * | 11/2018 | Weidman | G06Q 30/0211 |
| 10,127,603 B2 | 11/2018 | Garera | |
| 11,222,453 B1 * | 1/2022 | Aupetit | G06F 3/0486 |
| 2001/0029473 A1 | 10/2001 | Yamaoka | |
| 2003/0130878 A1 * | 7/2003 | Kruk | G06Q 10/06312 705/7.22 |
| 2003/0144924 A1 | 7/2003 | McGee | |
| 2005/0256759 A1 | 11/2005 | Acharya | |
| 2006/0136589 A1 * | 6/2006 | Konig | G06F 16/9535 709/224 |
| 2009/0018996 A1 * | 1/2009 | Hunt | G06Q 30/02 |
| 2009/0248547 A1 * | 10/2009 | Doenig | G06Q 10/06 705/28 |
| 2011/0066662 A1 * | 3/2011 | Davis | G06F 40/258 707/811 |
| 2011/0261049 A1 * | 10/2011 | Cardno | G06Q 40/04 345/419 |
| 2011/0283231 A1 * | 11/2011 | Richstein | G06F 3/0488 715/810 |
| 2014/0180790 A1 | 6/2014 | Boal | |
| 2014/0229879 A1 * | 8/2014 | Lee | G06T 11/206 715/771 |
| 2015/0169709 A1 | 6/2015 | Kara | |
| 2016/0071187 A1 * | 3/2016 | Bhosle | G06Q 30/0631 705/26.7 |
| 2017/0235436 A1 * | 8/2017 | Hooton | G06F 3/04817 705/7.11 |
| 2017/0351752 A1 | 12/2017 | Meehan | |
| 2017/0351956 A1 * | 12/2017 | Dubey | G06N 20/00 |
| 2018/0150869 A1 | 5/2018 | Finnegan | |
| 2018/0300793 A1 * | 10/2018 | Chen | G06Q 30/0631 |
| 2019/0108272 A1 * | 4/2019 | Talbot | G06F 16/288 |

OTHER PUBLICATIONS

BÃTrner, Katy, Chaomei Chen, and Kevin W. Boyack. "Visualizing knowledge domains." Annual review of information science and technology 37.1 (2003): 179-255. (Year: 2003).*

* cited by examiner

204

| | Field | Value |
|---|---|---|
| 1 | Manufacturer | HUSKY RACK & WIRE |
| 2 | Title | 111"W x 42"D x 120"H Steel Pallet Rack Add-On Unit, 19,380 lb. with Beams Evenly Spaced at 36" |
| 3 | Supplier Part # | 21E939 |
| 4 | Manufacturer Part # | 18421204３108DA |
| 5 | Image | <image object> |
| 6 | Price | $412.00; Each |
| 7 | Shipping | Extra |
| 8 | Pallet Rack Item | Pallet Rack Add-On Unit |
| 9 | Pallet Rack Style | Roll Formed |
| 10 | Overall Width | 111" |
| 11 | Capacity per Shelf | 5000 lb |
| 12 | Usable Width | 108" |
| 13 | Material | Steel |
| 14 | Pallet Rack Constr. | teardrop |
| 15 | Overall Height | 120" |
| 16 | Overall Depth | 42" |
| 17 | Number of Shelves | 2 |
| 18 | Color | Orange Beams / Green Uprights |

202

HUSKY RACK & WIRE [1]

111"W x 42"D x 120"H Steel Pallet RACK Add-On Unit, 19,380 lb. with Beams Evenly Spaced at 36" [2]

Item # 21E939 [3]

Mfr. Model # 18421204３108DA [4]

[5]

Catalog Page # 1476

Web Price $412.00 / each [6]

This item requires special shipping, additional charges may apply. [7]

TECHNICAL SPECS

Pallet Rack Item   Pallet Rack Add-On Unit [8]

Pallet Rack Style   Roll Formed [9]

Overall Width   111" [10]

Capacity per Shelf   5000 lb. [11]

Usable Width   108" [12]

Material   Steel [13]

Pallet Rack Construction   Teardrop [14]

Overall Height   120" [15]

Overall Depth   42" [16]

Number of Shelves   2 [17]

Color   Orange Beams/Green Uprights [18]

Item Data Extraction

FINE JEWELRY BOX BRACELET 8-7/8X2-1/2X7/8 36/CS

COPY PAPER HAMMERMILL COLOR COPY DIGITAL PAPER 28LB 8.5X11 28LB 500/REAM

COPY PAPER HAMMERMILL GREAT WHITE MULTI USE RECYCLED PAPER 20LB 8.5X11 500/REAM

LABEL LAST ACT STORE SHOE LABEL IN STORE 200 LABELS/ROLL 36ROLLS/CTN

CORRUGATED BOX 8X4X4IN RSC32 C NO LOGO FREIGHT INCLUDED SECAUCUS 25/BDL

BALLAST TSS-UV55PBXM ELECTRONIC INSTANT START OPERATATES 1 OR 2 120V LAMPS ALSO FOR CFL PL55W AND FLUORESCENT LAMPS F54T5 LAMPS EACH

SHOPPING BAG 16X6X15.75IN WHITE 250/CASE

SHOE CLIP CLEAR HOLDER FOR 2 X 3 INSERT 50/PKG

DISPENSER TOILET TISSUE KC9507 SMK JRT JR JUMBO EA 17489542

WRAP TISSUE WHITE 10X18 PRINT 10RM/CASE

AIR FRESHENER KC91067 CONTINUOUS REFILL CITRUS 6/CASE

PEN BIC BALLPOINT MED POINT BLACK INK DZ

*FIG. 9*

Comparable Item Candidates

| | Selection | | | | |
|---|---|---|---|---|---|
| Description | 55" 4K TV | LED HDR Television | 55" HDR Television with Wifi | 55" Smart Television | 4K Smart Television | 55" Wall mountable Television |
| Part Number | 120A0000 | 45SS445 | Q4056Z4 | 450MW45Q | 96874JX4PT | 1ZPN4593 |
| Manufacturer | Vizi | Vizi | Vizi | Tarragon | Sumo | Envision |
| Size | 54.6" | 50" | | | | |
| Resolution | 2160P | | | | | |
| Refresh | 60Hz | | | 60Hz | 120Hz | |
| HDR | Yes | | | | | |
| HDMI Inputs | 4 | 3 | | 4 | | 5 |
| HDR Tech | Dolby Vision | HD10 | | | | HD10 |
| WCG | Yes | No | | | | |
| Weight | 35.1 | 40.3 | | 33.8 | 31.5 | 34.7 |
| USB Ports | 2 | 1 | | 3 | 3 | 2 |
| Wall Mountable | Yes | | | | | |
| Max Brightness | 700 Nits | 500 Nits | | | 1000 Nits | 750 Nits |
| Local Dimming | 128 Zones | No | | | 192 Zones | 96 Zones |
| Contrast Ratio | 1200:1 | 900:1 | | | 1400:1 | |
| Price | $799 | $549 | $799 | $849 | $1099 | $749 |
| Comparable Score | N/A | | | | | |

*FIG. 14*

ADAPTIVELY ENHANCING PROCUREMENT DATA

BENEFIT CLAIM

This application claims the benefit under 35 U.S.C. § 120 of application Ser. No. 16/408,380, filed May 9, 2019, which claims the benefit under 35 U.S.C. § 119(e) of provisional application 62/670,470, filed May 11, 2018, the entire contents of which are hereby incorporated by reference for all purposes as if fully set forth herein. Applicant hereby rescinds any disclaimer of claim scope in the parent applications or the prosecution history thereof and advises the USPTO that the claims in this application may be broader than any claim in the parent applications.

FIELD OF THE DISCLOSURE

The present disclosure is related to digital data processing and graphical user interface. The present disclosure is also related to adaptively enhancing procurement data based on dynamic trends and user preferences.

BACKGROUND

Business to business electronic procurement (eProcurement) systems face several fundamental realities. There can be wide variance in item details and quality of item details across different supplier sites for the same item. Different categories of products often require varying richness of images, videos, and details specifications on an item (e.g., in scientific products, detailed specifications matter, whereas such detailed information may not be as important for general cleaning products). Different elements of data on an item may be source from different sources, such as general manufacturer/retailer sites, product data sheets, and UPC database(s). Thus, there is a need for technology to gather and reference item data from multiple sources, assess data quality at a data element level and a source level, and synthesize data from disparate sources into a comprehensive item master record.

SUMMARY

Embodiments designed to address the needs posed by the fundamental realities noted above could be implemented without undue experimentation by those of ordinary skill in the art based on the disclosure set forth herein. Such embodiments may also (or alternatively) provide other benefits, such as providing novel procurement metrics (e.g., data quality metrics), commodity based pricing, and visual spend maps. It is also possible that aspects of the disclosed technology could be used to implement systems which would apply master information gathered about particular items to create comparable items sets (which, in some embodiments, may be created and/or presented in real time) for the purposes of expanding competitive choices presented to buyers.

BRIEF DESCRIPTION OF THE DRAWINGS

FIG. 2 represents an exemplary extraction of data from an unstructured HTML page to a structured item record.

FIG. 8 represents an exemplary interface which could be used to present information from a predictive pricing model.

FIG. 9 represents an exemplary set of purchase order data.

FIG. 14 represents an example of the identification of comparable item candidates, and computation of "comparable score" for potentially comparable items.

DETAILED DESCRIPTION

Figure 1:
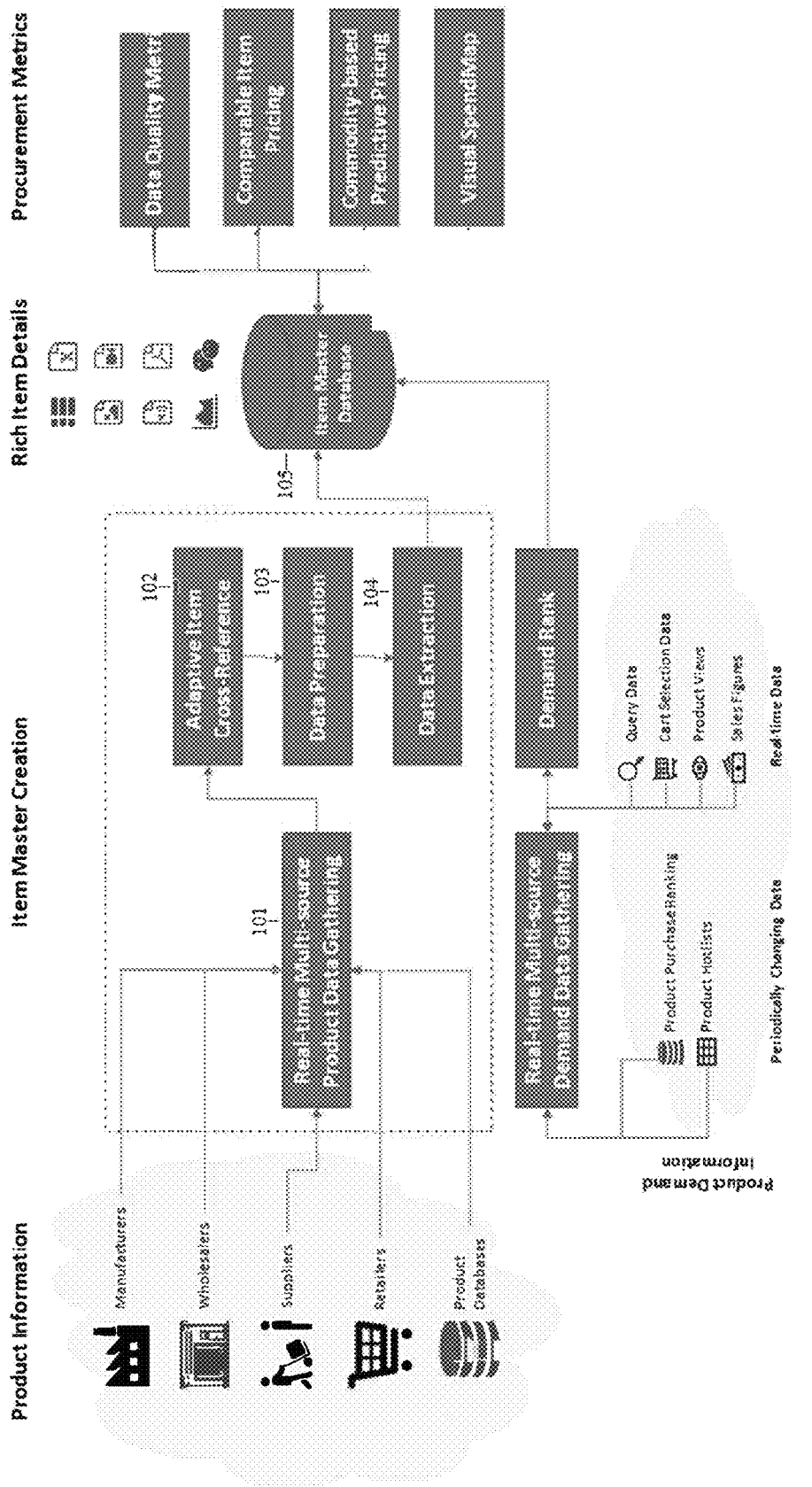
FIG. 1 represents a high-level architecture which may be used in some embodiments.

The disclosed technology can be used in a variety of manners, including to implement systems and/or methods that would improve the eProcurement process, such as through integration with an existing procurement system, or through operation as a standalone system. In general, the disclosed technology will preferably be implemented in the form of systems or methods in which computer programs provide functions not previously available in either standalone or integrated procurement systems. In various embodiments, such computer programs may be installed on and executed by computers which are also used for operating procurement systems, or may be installed and executed on separate computers (e.g., cloud servers) which could interact with and/or be integrated into procurement systems using mechanisms such as API calls. As will be apparent to those of ordinary skill in the art, the various examples, architectures, methods, and embodiments described herein are provided for the purpose of illustration and are not intended to exhaustively catalog all possible embodiments of the disclosed technology. Accordingly, the material described herein should be understood as being illustrative and should not be treated as limiting on the protection provided by this or any related document.

eProcurement systems attempt to present an online shopping experience for business users to find the products they need from contracted suppliers. Two typical options exist for suppliers to provide the contracted product data: a) product catalogs, b) punchout to supplier's eCommerce website from procurement system. Product catalogs tend to be fairly poor in providing product details and historically these catalogs don't have images, videos, and other aids that users expect to see. Punchout-enabled eCommerce websites from suppliers widely vary in the level of product information provided by them. Effectively, users of procurement systems are hampered by poor product data, which makes their B2B shopping experience dramatically worse compared to the B2C shopping experience they have in their homes and personal lives. The reason for this is that product information relevant to procurement systems is scattered across so many disparate systems with varying structures, nomenclature, organization, etc. Manufacturer's websites and/or product sheets contain a certain level of product details coming from their own specifications. Independent product catalog databases like IceCat try to consolidate product information from different sources. Supplier or retailer websites or eCommerce systems contain some product information that may or may not overlap with manufacturer provided information. User created product information may be present in some eCommerce websites such as user-created videos or reviews that add value to the information about the product. Then there are other systems that maintain records of product related information like UPC codes. Add to this the complexity of product information that may change by region or by language. Unlike traditional extract-transform-load (ETL) processes that work with a set of well-known data sources to consolidate information into datamarts/data warehouses, the challenge with the disparate data sources of product information in procurement is that there is dramatic disparity and variance and complexity in the types of sources (manufacturer sites, databases, spreadsheets, spec sheets, marketing literature, and supplier specific literature, websites or eCommerce systems, 3$^{rd}$ party databases and more), the access methods (database, FTP or other methods to get at data dumps, web site access over http or https), security methods (open, general secure, or customer-specific secure access), the data elements (the available fields of data associated with a given product), the data formats (structured, semi-structured, or purely unstructured), and the data quality (enormous variation in data quality on a field by field basis for a given product across sources) associated with product information. Good, clean, high quality, comprehensive product information is vital to help users find what they need, and to suppliers to help their products be found.

Referring now to FIG. 1, that figure depicts an architecture that may be used in some systems implemented based on this disclosure. In a system implemented based on FIG. 1, various procurement metrics may be provided using a process which includes real time multi-source data gathering 101. Real time multi-source data extraction may be performed in the context of real time search or may be performed in the context of offline crawler-based retrieval of item detail pages. This may be done to allow such a system to maintain knowledge of item data from different sources, and how that data changes over time, while still being able to combine data item fields from across sources into a single comprehensive item record. In some embodiments, real time multi-source data gathering may entail gathering data for various data sources and then crawling those sources to retrieve data for individual items. In these types of embodiments, the sources from which data is retrieved may include manufacturer data, retail website data, UPC data, one time data dumps from retailers (e.g., Amazon, Walmart, etc.) and open source data sources such as IceCat. The information retrieved from those sources could then be used to create intermediate data records which would have a structured form and could be populated with unstructured data from the various data sources. An exemplary extraction performed as part of the multi-source data gathering 101 in some embodiments is provided in FIG. 2, where data from an unstructured HTML page 202 is converted to a structured item record 204. Such extraction could be performed in a variety of manners, such as through the use of software agents (which may be general or specific to individual data sources) as described in U.S. Pat. No. 7,756,750 to Venkiteswaran for a method and system for providing online procurement between a buyer and suppliers over a network, the disclosure of which is incorporated by reference in its entirety.

In addition to gathering data as described above, in some embodiments, real time multi-source data gathering 101 may include performing ongoing updates to item data. These may include natural updates. In embodiments which perform natural updates, these could start with monthly data refreshes, and a computer configured to perform the updates could subsequently assess the pace of change/additions/deletions of items from the source in a given category, and then adapt the refresh cycle from that source for that category accordingly (e.g., if new data is consistently found in a monthly refresh, then the refresh cycle could be progressively shortened until a refresh period was found was short enough that the data could be expected to remain stable). Ongoing updates may also include on-demand updates. Such ongoing updates may use various events as triggers for updates, such as a user search reveals an item not seen in an item master record (discussed further infra) an alternative suppliers check reveals items not seen in an item master record, and/or purchase order data from a client (i.e., an entity using the disclosed technology to improve their procurement processes) reveals item not seen in an item master record. In embodiments where such on-demand updates are performed, they may queue up item data for subsequent scoring and merging into an item master record.

Continuing with the discussion of FIG. 1, as shown in that figure, embodiments of the disclosed technology may also include adaptive item cross referencing 102. In some embodiments where it is present, adaptive item cross referencing 102 may account for the fact that some common types of identifiers may not be present for all items, and some types of items may have unofficial domain specific identifications that may not be applicable more generally. For example, in many cases, the most "procurement friendly" product identification will be the supplier part number. However, while this information will generally be available for almost every supplier, there may be some issues. For example, supplier names may be inconsistent across systems (e.g., an ERP system may list "Hewlett Packard" while technology integrated into a procurement system may list "HP Inc."). Similarly, there may be inconsistencies in the representation of supplier part numbers (e.g., an ERP system may list 123-456, while an external system integrated into a company's eProcurement infrastructure may list it as 123456). Additionally, if an item is customizable (e.g., a user-configured laptop), each purchase may have its own identification, or an "alternate" identification may be used to distinguish. Also, some suppliers may use the same identification for different units of measurement (UOM), and so in some cases it may be helpful to consider unit of measurement for a unique identification as well.

As an alternative (or supplement) to a supplier part number, some embodiments may use manufacturer part number as a form of universal identification. However, this will generally suffer from many of the same problems as a supplier part number (e.g., inconsistent formatting). Additionally, manufacturer part numbers may be less available than supplier part numbers, as manufacturer part number are less likely to be required to be included in purchase orders (which, as noted previously, could be one source of data used by a system implemented based on this disclosure). There are also a wide variety of other identifications which may be present for specific products, such as GTIN (global trade item number), UPC (universal product code), EAN (European article number, aka international article number), ISBN (international standard book number), ASIN (Amazon id), and CAS (chemical abstracts service number). There is a very large number of products that have these, but they are not truly universal (e.g., a chemical might not have a UPC, a book might have an ISBN instead of a UPC, etc.). Further, some data sources, especially supplier websites, can be very inconsistent in what they provide, making these types of additional identifications even less reliable (e.g., even if an item has a UPC, it won't necessarily be available on a supplier's site).

Figure 3:
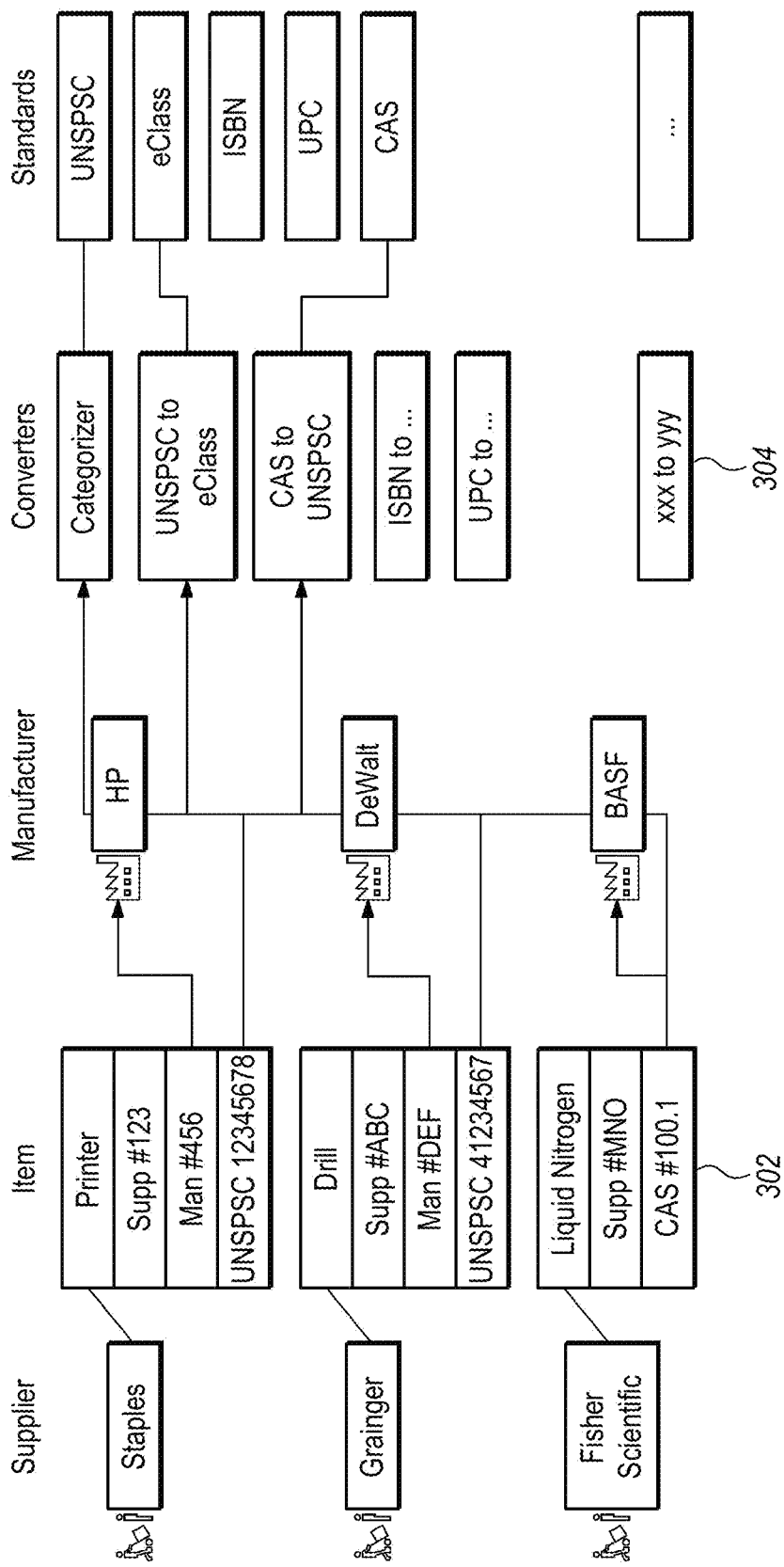
FIG. 3 represents an example of creating item cross references.

Some embodiments may account for/take advantage of the existence of multiple identifiers by using them as a bridge between suppliers for various items. For instance, a system implemented based on this disclosure could be configured such that, if product data is retrieved from Amazon, the ASIN for that product would be converted to a UPC and that UPC could then be matched against data retrieved from other suppliers who might have UPC information. An example of this type of cross referencing with multiple identifiers is provided in FIG. 3. In FIG. 3, each of the items 302 has a number of fields, typically including a manufacturer identifier, a supplier identifier, and an item identifier. An item identifier in a first format can be converted to an item identifier in second format using one of the converters 304. In general, a system could be programmed to recognize when product information included multiple identifiers, and to match any of those identifiers with identifiers included in other product information from other sources, thereby allowing any two products connected by a chain of identifiers to be cross referenced against each other. Direct matches could also be performed, such as CAS might be used to match products from different chemical suppliers even when no other identification may be available. Additionally, in some embodiments, the contents of identifications (e.g., internal patterns) may also be used to drive identifications/classifications. For example, UPC codes can be used to identify manufacturers, which identification can be used to drive classification of a particular manufacturer's goods, or identification of a particular product (e.g., by searching for information from the particular manufacturer identified in the UPC code). In some embodiments, the same type of approach might also be applied to map identifiers such as UPCs to categorical taxonomies like UNSPSC, ultimately creating even further connections between products from different sources which may not all have the same types of identifiers.

Figure 12:
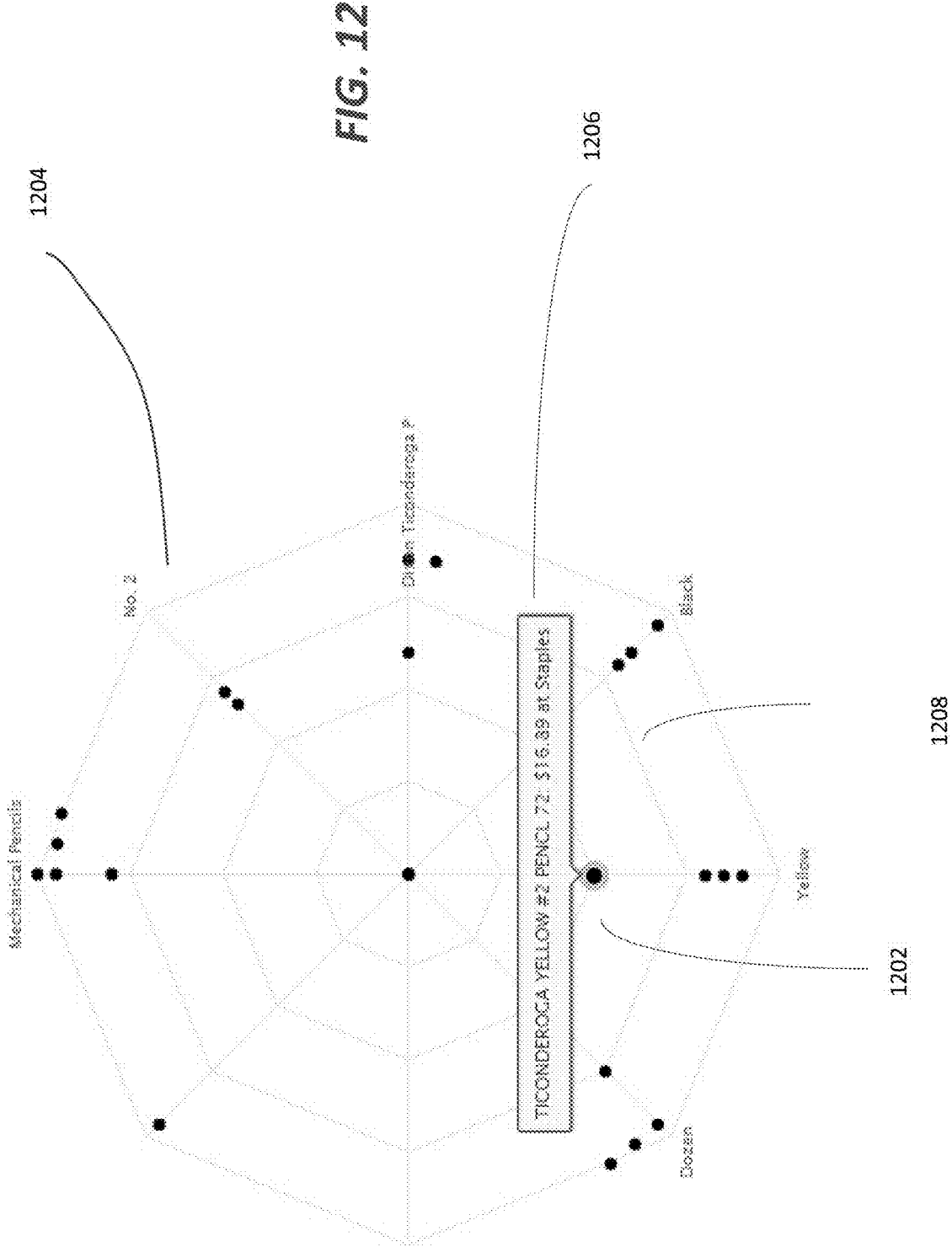
FIG. 12 represents an example of grouping items based on price and text analysis.

An alternate way to group items together is through metadata analysis of procurement attributes available from electronic procurement systems. See FIG. 12 as an example of grouping items based on price and text analysis. In FIG. 12, a graphical depiction of comparable items to a first item may be displayed using a spiderweb motif. A center dot 1202 in FIG. 12 represents a first item that an end-user has searched for (or already has in their inventory). An end-user may wish to qualitatively understand how close a group of similar items are to the original item. Finding comparable items based on specific phrases and similar prices can allow comparable items from different suppliers and manufacturers to be identified. The radial spokes of the web 1204 may be automatically determined by parsing a description 1206 of the original item or configured through an interface to provide a context for the basis of similarity (e.g., mechanical pencils, boxes containing a dozen pencils, No. 2 pencils, etc.). The graduating circles, such as 1208, provide additional context across all items depicted on the spiderweb motif on a specific characteristic such as price (as shown in FIG. 12). Prices that are closer to the original item's price will be displayed closer to the center and vice versa. Like the consolidation of categorical taxonomies, this allows for the consolidation of similar items across disparate suppliers and manufacturers. For example, the diagram of FIG. 12 shows finding comparable pencils based on similar price and similar procurement attributes such as type (mechanical, no 2), color, and unit of measure (dozen).

Figure 13:
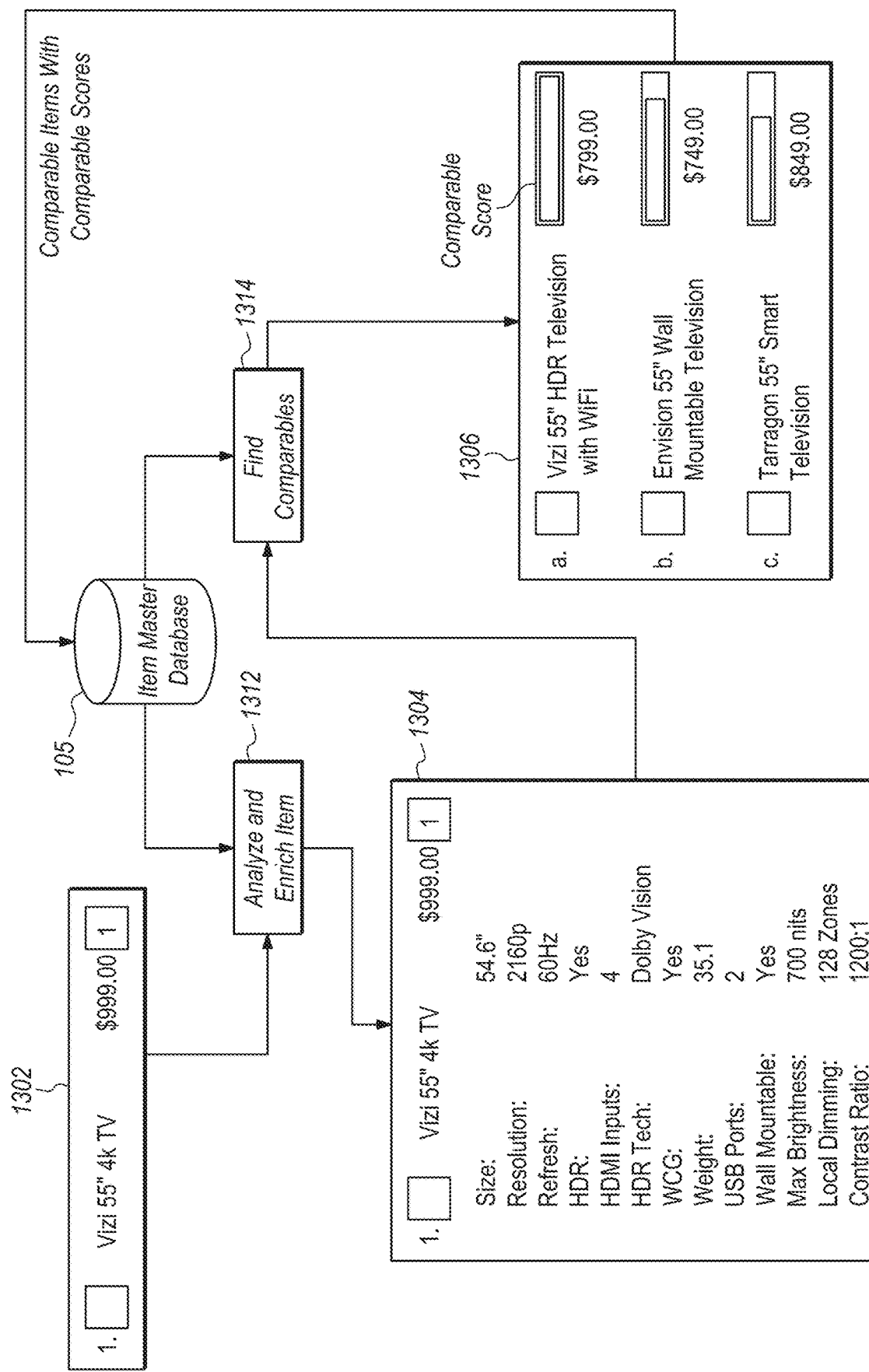
FIG. 13 represents a process of finding comparable items for a given item.

FIG. 13 illustrates a process of finding comparable items for a given item. Starting with an item 1302 from, say, a user's cart selection, the system through the step 1312 analyzes the given item and enriches it with data from an item master database 105 such as shown in FIG. 1 (the "Item Master Database"). The enriched item 1304 is then used to find through the step 1314 comparable items using the Item Master Database. The comparison algorithm uses text analysis, parametric matching, proximity, and similarity analysis, to find potential comparable item candidates and then proceeds to compute a "comparable score" for each comparable item candidate. The top items 1316 from the list of comparable item candidates, based on the comparable score, are provided for application to, say, a user's cart selection. Further, comparable items, and their comparable scores for the given item, are returned to the Item Master Database to maintain an adaptive understanding of comparable items for any given item.

FIG. 14 illustrates an example of the identification of comparable item candidates, and computation of "comparable score" for potentially comparable items. In FIG. 14, the second column from the left 1402 shows the current selection. The other columns to the right of the second column show the items comparable to the current selection. Each row excepts for the top row shows an attribute of each item. In each row, the different types of shading of the cells indicate different degrees of similarity with the current selection. Rather than relying on part number matches alone, this method does a more complex attribute analysis and comparison to derive "comparable score". A simple algorithm identifies the number of matching attributes for a potentially comparable item with a given item, and produces a comparable score on a 0-1 scale, 1 being identical, 0 being not a match. A more complex algorithm takes into account semantic information on the priority ranking of attributes for a given product type (e.g. for televisions, the semantic information might provide a prioritized rank of attributes starting with size, resolution, refresh, HDR, HDMI inputs and so forth, in that order), and applies a weighted score for each attribute, to compute the comparable score for each potential comparable item candidates. Another algorithm may take into account the user preferences based on must-have attributes, nice-to-have attributes and don't-care attributes (e.g. for a 4K television, a user might indicate that the "screen size" and "resolution" are must-have attributes, "HDMI inputs", "USB ports", and "max brightness" are nice-to-have attributes, and by implication, the rest of the attributes are don't care attributes for this user), and based on this weight the comparable item candidates on their match for the attributes based on the indicated user preference, and compute a "comparable score" based on this information.

Yet another algorithm might track usage and user preferences and selections from a "compare products" feature where the user can choose specific items to compare, and apply those preferences and selections as direct evidence of user interest in select products deemed as comparable, and include such selected products for comparison based on the tracked preferences and selections by users in the past, and apply weights appropriately to compute a "comparable score" for each comparable item candidate. An adaptive algorithm may take multiple factors into account, including item selections in cart, item orders, items included by users in a compare items feature, past cart replacements from comparable item suggestions, semantic information of attribute priorities for comparing items, direct user preference on must-have vs nice-to-have vs don't care attributes for comparing items, to compute a "comparable score" for each comparable item candidate.

Figure 15:
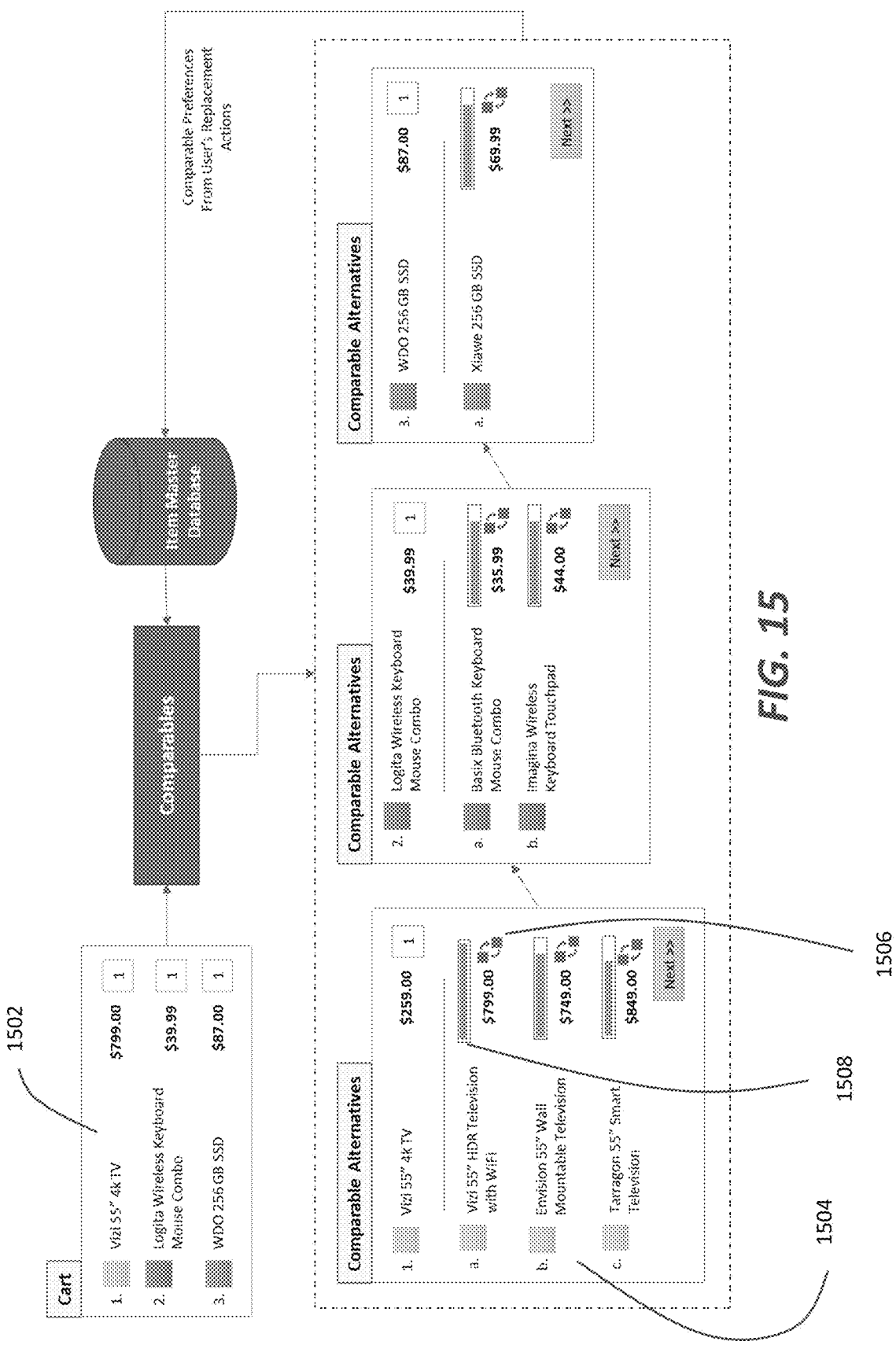
FIG. 15 represents a process of applying comparable items to the user's selections in a cart.

FIG. 15 illustrates the process of applying comparable items to the user's selections in a cart. For each item in the cart selection, such as the item 1502 of "Vizi 55" 4K TV", the process is invoked to find comparable items along with their comparable scores, such as the list 1504 including three comparable alternatives for the item 1502. The comparable alternatives are presented to the user for each item in the cart selection, with the option for the user to replace the original item in the cart selection with a suggested comparable alternative item. For example, the first comparable alternative for the item 1502 is shown with a comparable score 1508 and an option 1506 that allows the user to replace the item 1502 by the first comparable alternative. Where the user chooses to replace a cart selection with a comparable, that preference is returned back to the Item Master Database to store as comparable user preferences for the given item, enabling the Item Master Database to have an adaptive understanding of user preferences for comparable items, data points which would go into the computation of the adaptive comparable score for a comparable item for a given item.

As shown in FIG. 1, embodiments of the disclosed technology may be implemented to include data preparation 103. This may be used, for example, to address the situation where some sources may have rich images, others may have video, others may have great descriptions, others may have rich product attribute information, but no one source may have all information that should be presented for a product. In some embodiments, data preparation 103 may include assessing the quality of each data element from each source. This could, for example, facilitate merging of data elements from multiple sources and/or the deployment of an autonomous learning engine that could improve over time in how data elements from different sources may be assessed and merged. In embodiments where it is present, such a quality assessment may be implemented by applying intelligent scoring to data a supplier provides in its catalog, for instance by analyzing each field compared to what is typically expected and proving a quality modifier score to express the relative (i.e., as compared to expectations) quality of what has been provided.

Figure 4:
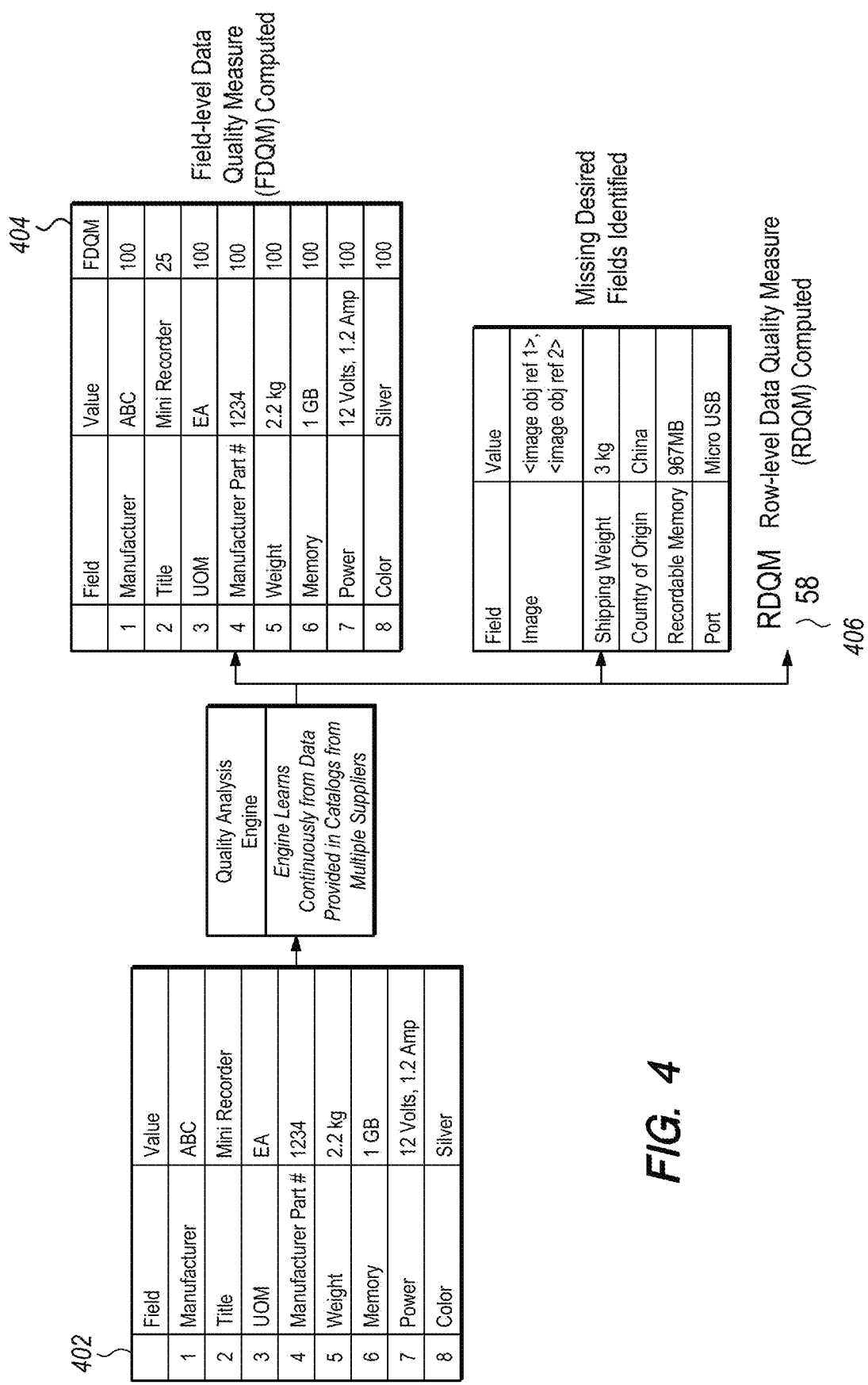
FIG. 4 represents an example of how quality can be measured for a row of catalog data.
Figure 5:
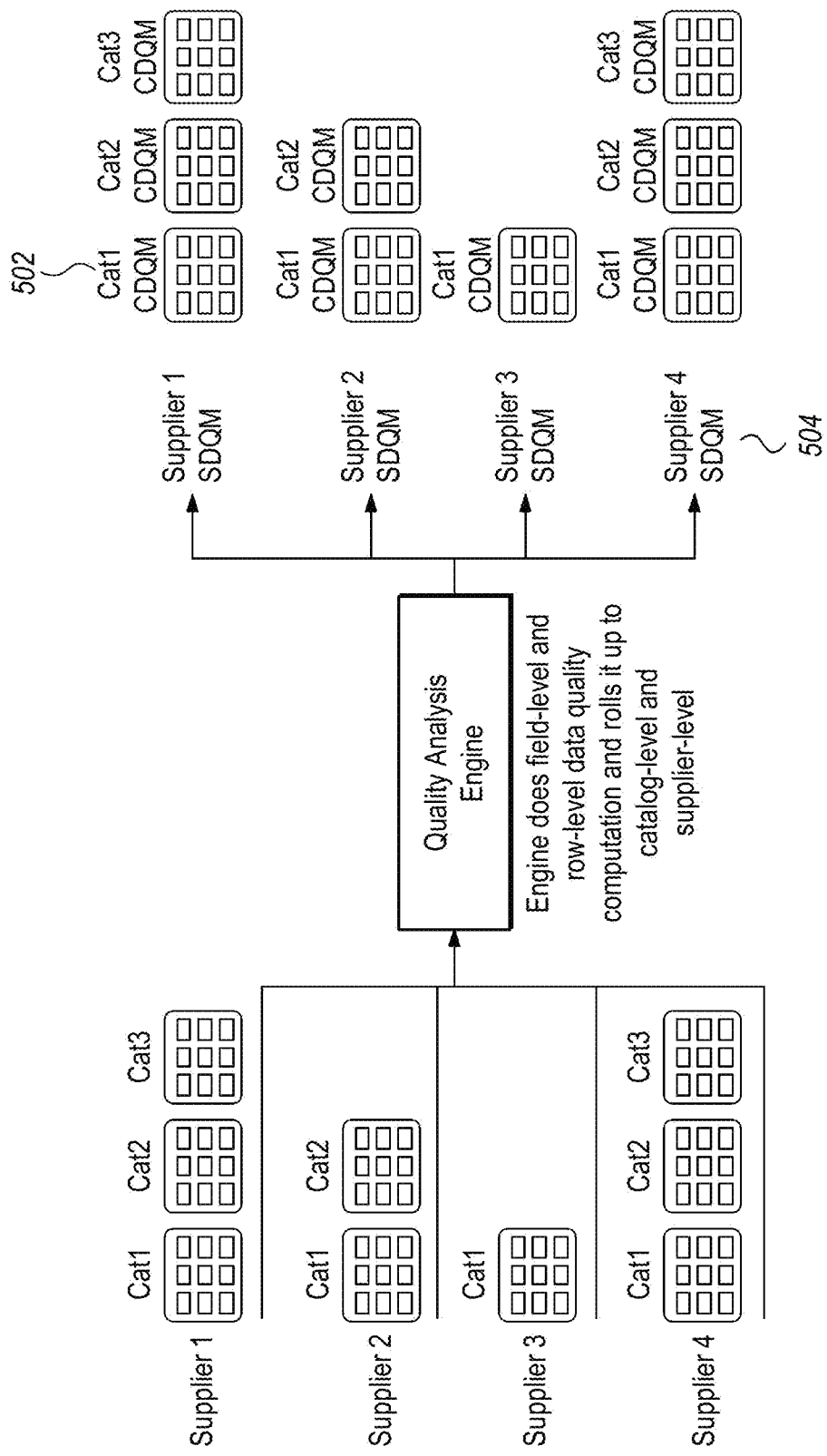
FIG. 5 represents an example of how quality metrics can be calculated for catalogs and the suppliers providing them.

To illustrate how this type of data preparation 103 may take place, consider FIG. 4, which shows how data quality can be measured for a row of catalog data, and FIG. 5, which shows how quality metrics can be calculated for catalogs and the suppliers providing them. Preferably, when calculating quality metrics, individual metadata fields of a record 402 will initially be evaluated for data quality to produce a field-level data quality measure (FDQM) 404. Next, a row level data quality measure (RDQM) 406 can be created by applying weights to the FDQM of the individual metadata fields that comprise a catalog item record and adjusting for completeness and quality, such as the effect if missing desired fields. Such weights may provide higher values to key data elements such as:

Manufacturer part number
Manufacturer name
Unit of Measure
Price
Item Title
Item long description
Commodity code
Lead Time
Supplier Part Number
Weight
Dimensions
Shipping Weight
Shipping Dimensions
Country of Origin Preferably, the more quality data a supplier can provide for each item in their catalog, the higher their overall score will be (which, in some embodiments, could ultimately be rolled up into an overall catalog data quality metric—CDQM 502). Additionally, as a supplier may provide more than one catalog, in some embodiments the overall quality of a given supplier's catalogs may be computed as a supplier quality data metric (SDQM 504). Exemplary calculations for determining these values are:

Catalog Line Quality score=The sum of the following for each catalog field: (Field Weight*Data present (1 if data is present, 0 if no data is present)*Data quality score)

The overall catalog score=the Sum of Catalog Line Quality Scores/The count of Catalog line items The supplier overall Data Quality Metric=Weighted Moving Average of the last 20 catalogs they have submitted (where the most recent catalog is weighted 20/20 with the oldest catalog weighted 1/20).

Figure 6:
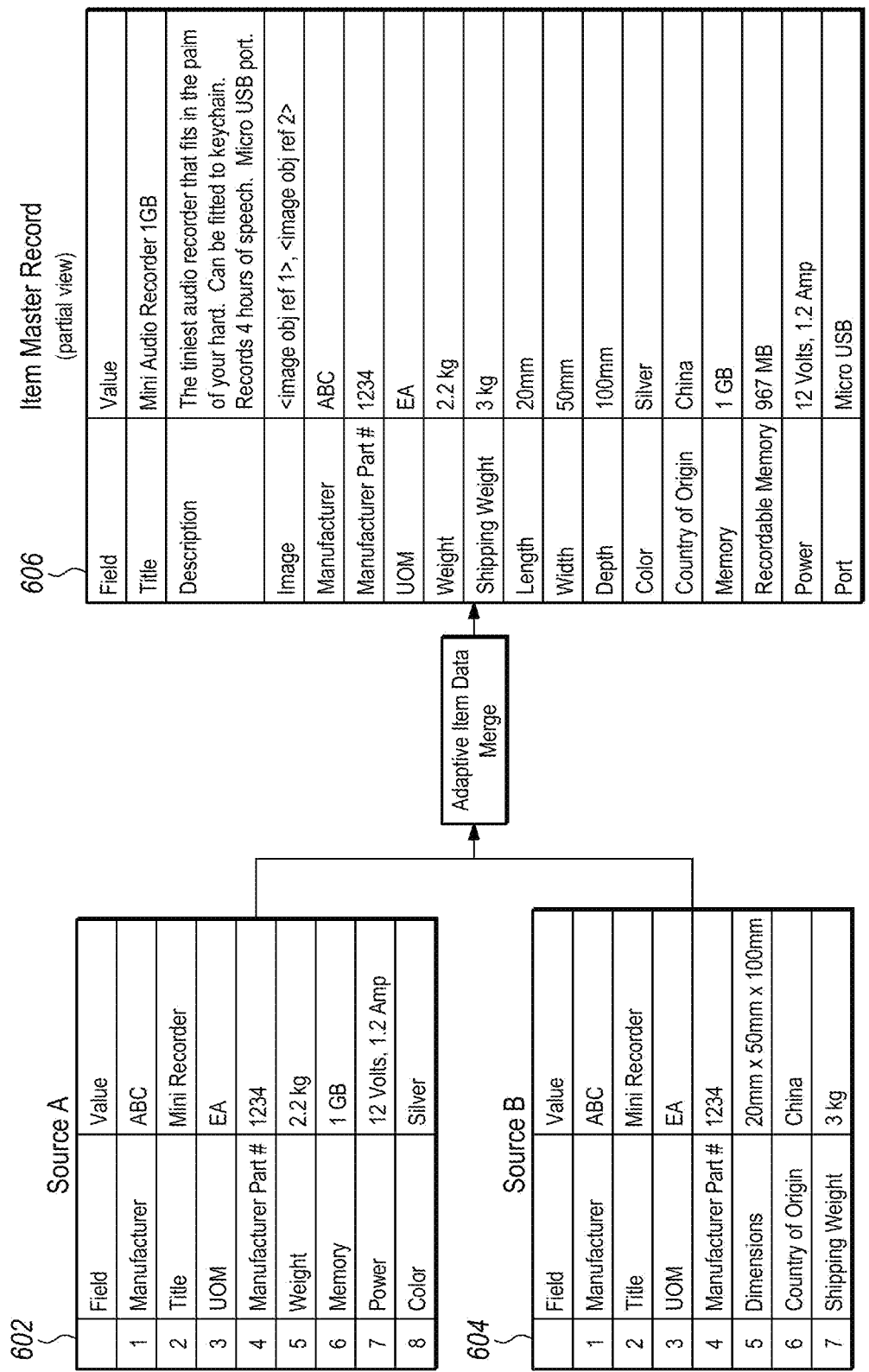
FIG. 6 represents an example of how multiple data item records could be consolidated.

Taking advantage of information provided by data preparation 103, some embodiments following the architecture shown in FIG. 1 may also include functionality for data extraction 104. In particular, once item details are gathered from multiple sources 101 and extracted in a structured way, items are cross referenced 102, and data is prepared 103 through item quality assessment, the data can be extracted 104 and consolidated into a single comprehensive master item record. In some embodiments, this may be performed by evaluating items from multiple sources against manufacturer name and part number and, when these data elements match, creating a new single item with the combination of additional metadata that describes the item. An example of how this may take place is shown in FIG. 6. Preferably, when merging multiple records 602 and 604 into a master record 606 for an item, fields that are duplicated in both underlying records but that do not match will be evaluated for quality, and the higher quality metadata will be applied to the master record. In this example, the value for the second attribute of title of the record 602 is "Mini Recorder", while the value for the second attribute of title of the record 604 is "Mini Audio Recorder 1 GB". In some embodiments, relative quality may be determined by a machine learning system trained to understand what correct data should look like for each field. For example, a title with only one word such as "Barstool" would typically be less desirable than "30 in rotating barstool with back." Similarly, where data is provided in the correct format but is factually incorrect, this will preferably be identified as lower quality data (e.g., continuing the barstool example, a UNSPSC code of 42192111 is close but incorrect (this is for a medical stool) while a code of 48102005 would be correct). Once such master item records have been created, they will preferably be stored in a database 105 for further processing or in support of further functionality as described below.

One type of additional functionality which could potentially be supported using a database of data records such as described previously is to provide a commodity based predictive pricing module 106. In some embodiments, such a module could be used to provide a focused cost benchmark in market niches that have no coverage, such as: office supplies, auto parts, computer accessories, power tools, lab supplies, security equipment, electrical components, safety clothing/equipment, first aid supplies, paint and painting equipment, hand tools, chemicals and gasses, lighting equipment, novelty/promotional items, office furniture, beverages, interior/exterior signage, networking equipment, cleaning supplies and solvents, fabrics and sewing accessories, indoor/outdoor plants, trash/recycling equipment, etc. Services typically priced by the hour, or square foot/meter could also apply to this process, examples would be painting, auto repair, computer programming and support, security, office cleaning, translations, drivers, local couriers, etc. This could be done by creating baskets of common items in various commodity groups, then tracking how retail pricing moves for these item baskets over time. Specifically, this could be implemented using a method comprising steps of:

Defining at least 20 items for each basket;
Tracking pricing periodically (e.g., weekly or, preferably, daily) for these items across multiple (e.g., three) suppliers, and average the pricing for each supplier to get a blended price;
Set the initial basket pricing as a market basket (MB) value of 100;
Track basket price movement percentages as percentage changes in MB;
Review basket items periodically (e.g., quarterly) to replace obsolete items;
Use basket pricing data to create a predictive model to estimate likely price changes over time.

Figure 7:
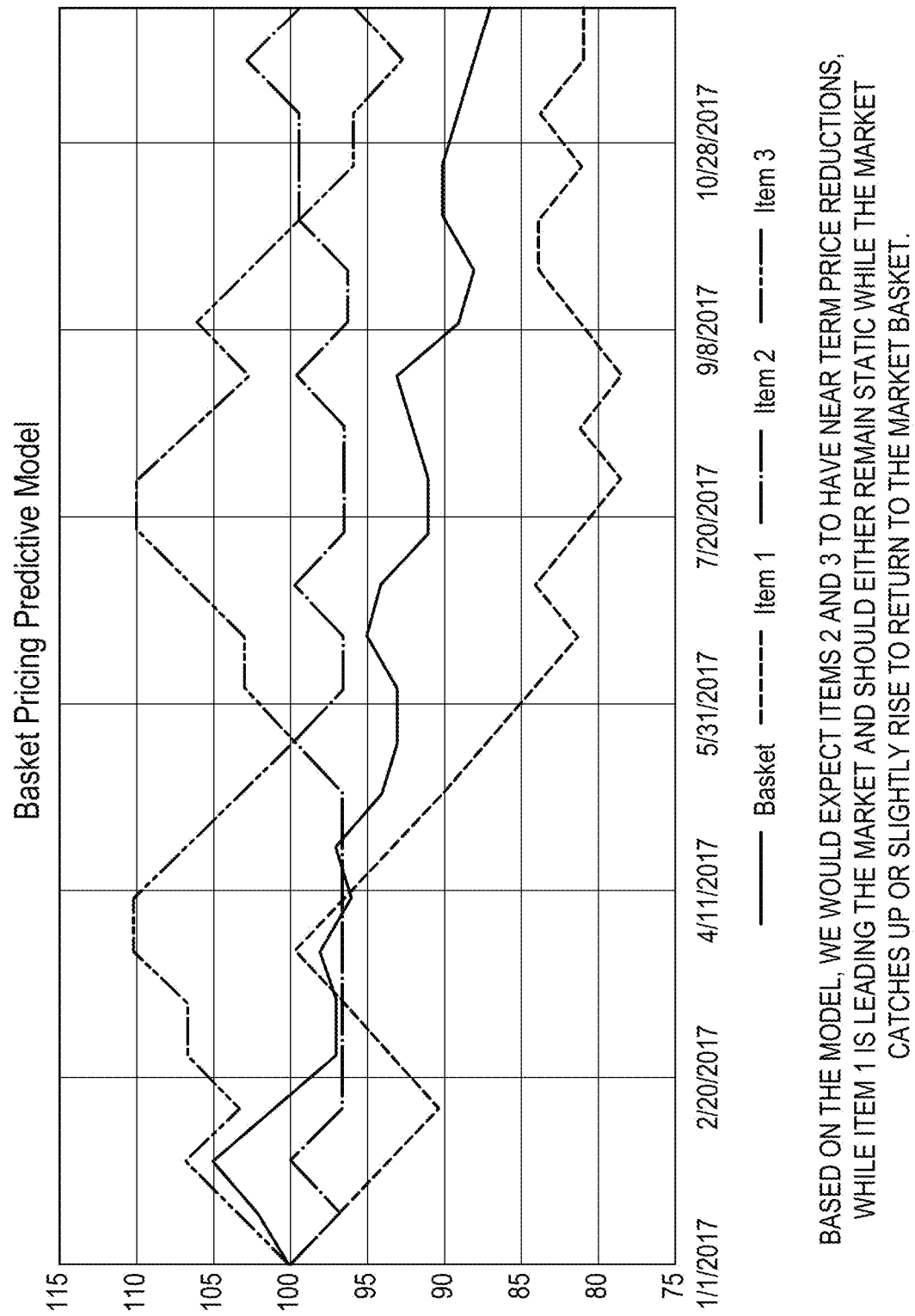
FIG. 7 represents a potential output of a basket pricing predictive model.

A potential output of a predictive model defined as described above is provided in FIG. 7, where Item 1, Item 2, and Item 3 belong to a market basket and experience price fluctuations over the period of nine months. The aggregate price history for the market basket shown by the Basket curve can be used to estimate future prices for each of the three items.

It should be understood that while such a predictive model could be trained on price changes for items in a market basket, in some embodiments, the predictive model might be applied not only to basket items but also to items that are similar in form and function. In such embodiments, this may be coupled with tracking of individual item prices over time to allow a comparative measure of how pricing for an entire market of similar items has changed versus how the pricing of a particular item has changed. Then, if these movements are not occurring at a similar velocity, it may be assumed that the item has deviated from the overall market and therefore should return to the mean at some point in the near future. This can be applied by showing customer a visual indicator when shopping for a product if that product's price is higher or lower than expected, or if a new term price increase or decrease should be expected.

Figure 8:
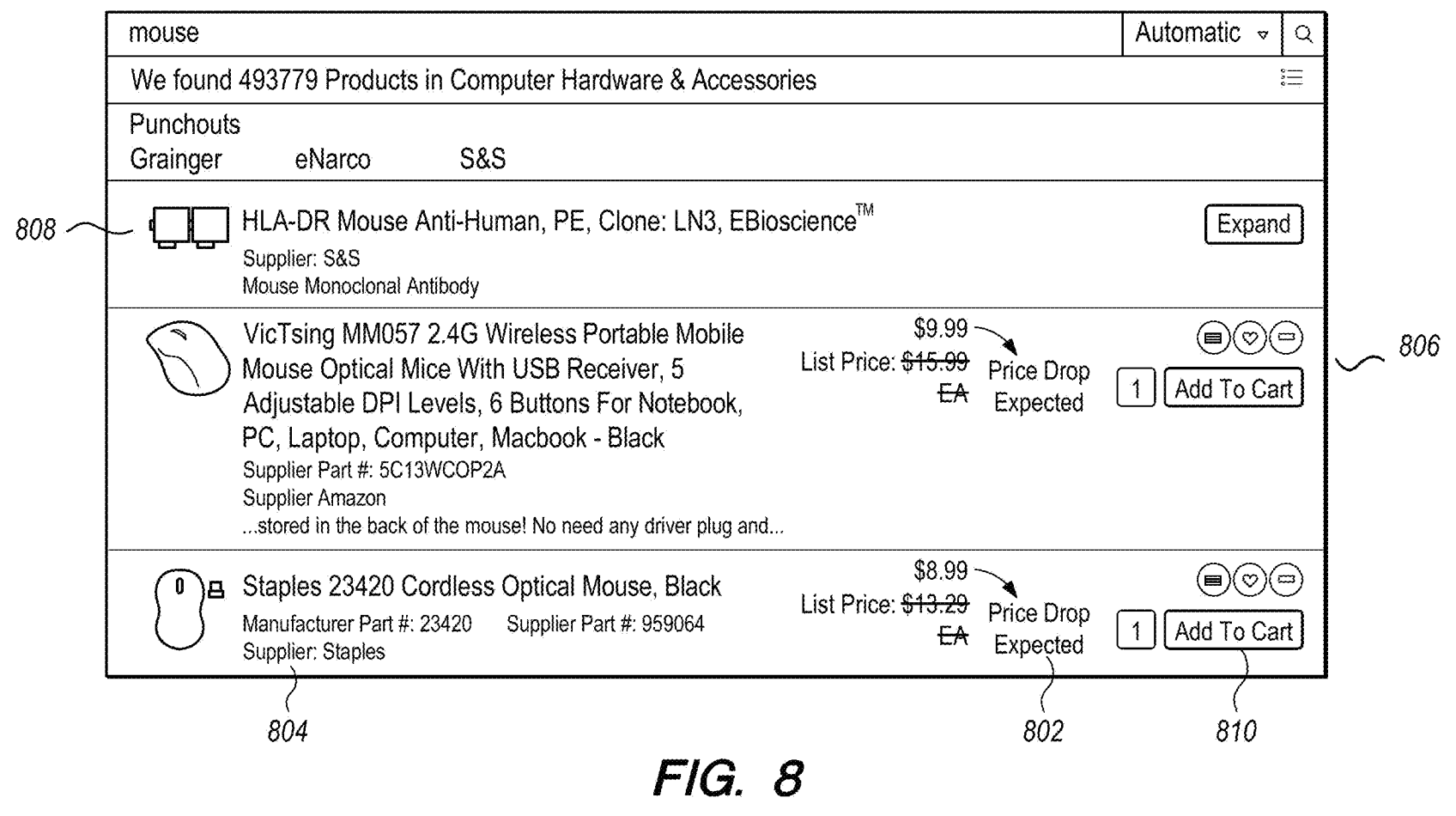

To illustrate, consider the situation in which a market basket of computer accessories is created and tracked over time. In this scenario, the overall price movement of the basket may be a reduction by 20%, but, when a user searches for a computer mouse, some of the items in the search results may have only experienced a 12% price drop over a similar period of time. Based on this divergence, it can be expected that the individual items should have a price decrease in the near future. The user may then be notified that a price decrease is expected. If the user has the flexibility to delay the purchase, they should, as the item should be available at a lower cost on a later date. An example of an interface which could be presented to a user in an embodiment supporting this type of functionality is provided in FIG. 8. In FIG. 8, a listing 806 of items, including the item 804, is presented following the listing of the item 808. The item 808 may already be in the cart or a wish list or is included in a search result. The listing 806 may cover items comparable to the item 808. For the item 804, an indicator 802 of an expected price trend calculate based on the price history of the corresponding market basket is shown to provide a user with more information. The user is also given the option 810 to add the item 804 to the cart. The user also would have the option of setting an automatic purchase at a specific price and quantity. Once the user has set their parameters, the system will automatically monitor the item for the user and create an order when the target price has been reached. The user will be notified when that occurs so they can come into the application to complete the purchasing process.

Another predictive model can be created via monitoring of search volume for an item vs the number of suppliers that can provide that item. Traditionally, buyers only had a view of the volume of orders they placed with their suppliers, however buyers have always been blind to the following data points: Searches for and/or inquiries made about a product and the number of suppliers capable of providing the product. Combining these previously unknowable demand and supply indicators allows for additional data to be used in dynamic predictions on how the price of an item could be expected to move (higher or lower). Visibility on demand where orders are not placed is especially useful as business searching is typically only performed when there is intent to buy, or to put together the budget request to perform the purchase. Providing insight on coming demand spikes (or lack of future demand) and changes in the number of potential suppliers allows for price movement predictions that would not be possible in any traditional market.

As another example of functionality that may be provided by various embodiments of the disclosed technology, consider a module that would provide a visual spend map 107 to a user. In some embodiments, this type of functionality could provide or be supported by features such as automatic analysis of unstructured purchase data to create natural spend categories without first requiring setup of complex a priori automatic classification methods; visualization to view and drill down to natural spend categories; an interactive interface that enables users to map natural spend categories into the organization's eProcurement spend taxonomy; and a learning engine that creates and enhances customer-specific (organization-specific) spend classifiers. Preferably a visual spend map tool will enable a user to upload historical data (e.g., in the form of an Excel spreadsheet) with only a few mandatory fields (e.g., line item title, date, spend amount), though a visual spend map tool may be implemented to obtain data from live purchase data already available as well (or as an alternative to upload of historical data by a user). Such a tool will preferably analyze data (e.g., uploaded historical data and/or live purchase data) to ensure that the data is indeed usable (e.g., determining numbers of rows and columns and asking the user to confirm that the row and column counts are correct). Such a tool will also preferably extract mandatory fields for rows and data and perform some automatic cleanup and normalization of the data (e.g., normalizing addresses/location data, date, currency, transforming item title by breaking it down into constituent parts).

Buyer organizations, especially the larger enterprises, tend to maintain their own complex taxonomies using which they try to map and measure spend. However, due to their own size and corresponding organizational and spend complexity, the spend data is not readily usable to do good spend analysis. For example, the purchase order data which tends to be a source of records for spend, does not contain rich line item details, or classification of spend at a line item level. In turn, complete and trustable spend analysis has been a challenging problem for most organizations. Historic as well as most contemporary approaches to solving this problem have involved either building custom automatic classifiers (which tends to be an expensive and time-consuming exercise, and tends to be fairly rigid when complete and not adaptable to the changing spend patters in the organization), or providing a standardized classifier (that might classify spend data to a standard, such an UNSPSC, which doesn't readily map to the organization's custom spend taxonomy).

Embodiments of the technology disclosed herein may take a different approach to deal with the ground realities of poor line item details in purchase order data and enabling a really flexible adaptable approach to generating organization-specific spend classifiers.

Figure 10:
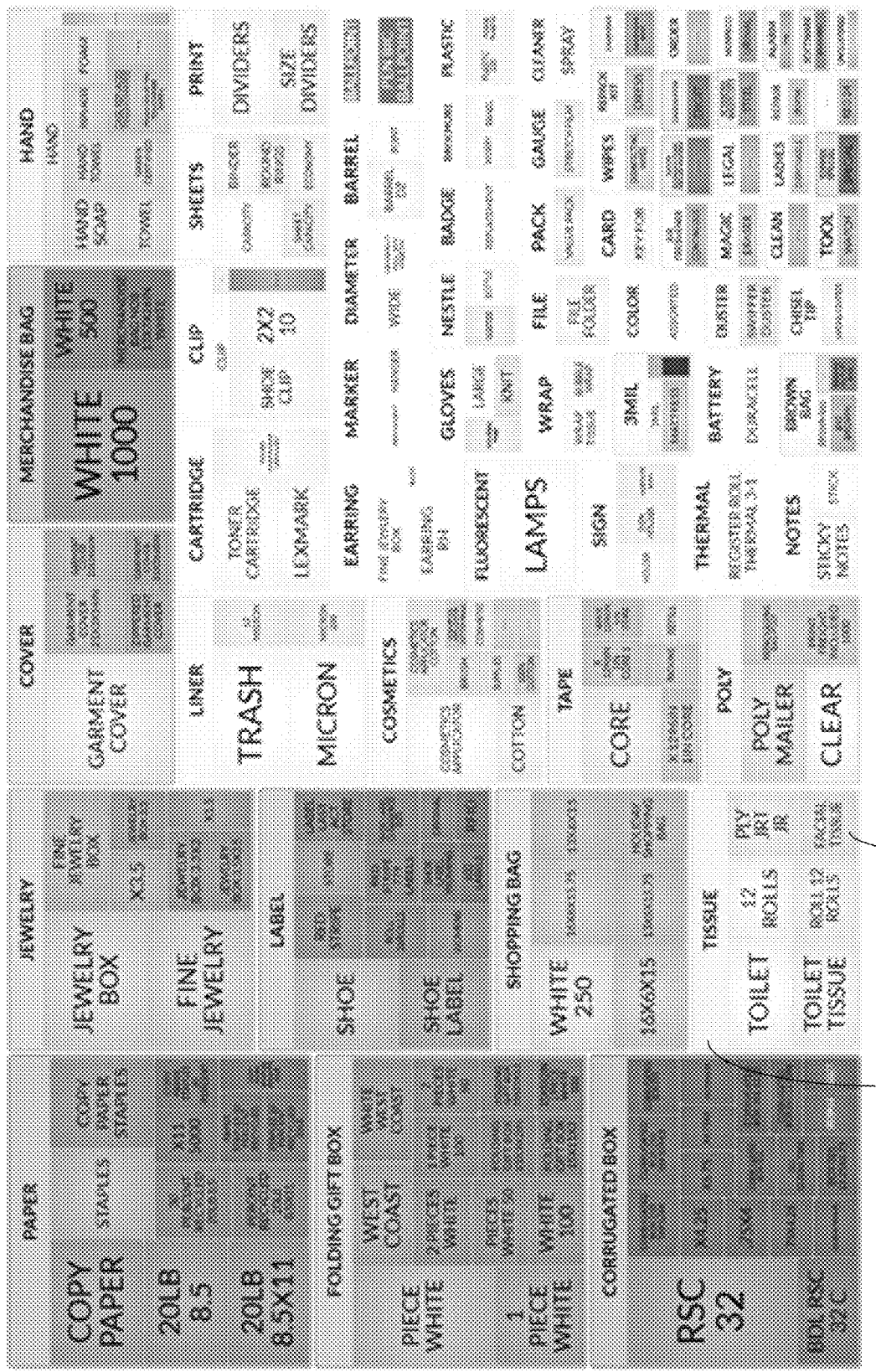
FIG. 10 represents an exemplary spend visualization map.
Figure 11:
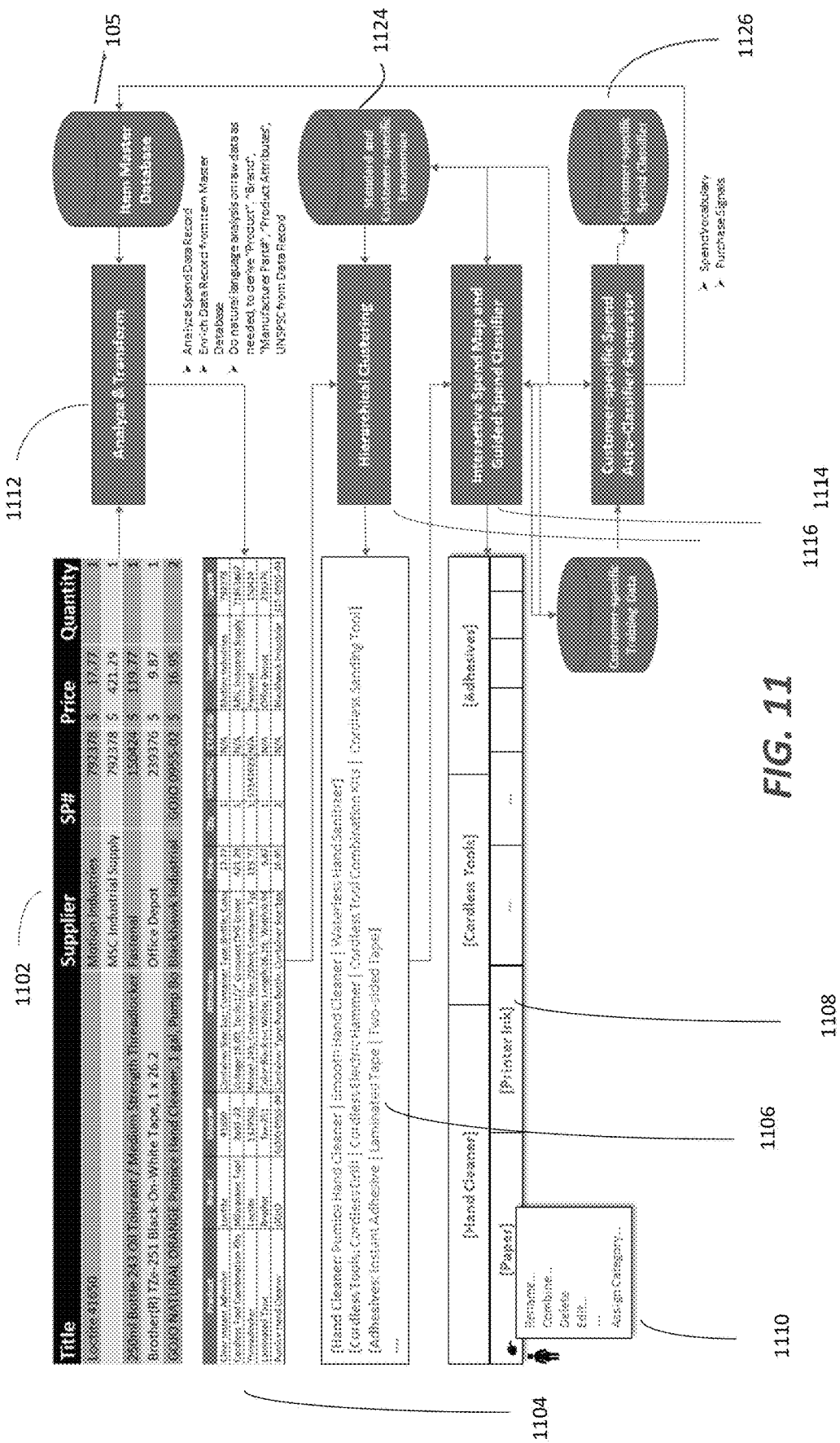
FIG. 11 represents an example of an approach that may be taken by some embodiments to generate organization specific spend classifiers.

FIG. 11 showcases an example of an approach that may be taken by some embodiments. Starting with purchase order data 1102 with poor or incomplete line item details, the system analyzes the data through the component 1112, assesses the quality scores at field and record or line item level, and utilizes the Item Master Database 105 to enrich each line item detail with the desired product details and attributes. The enriched purchase dataset 1104 is processed by a hierarchical classifier 1114 that is capable of additionally managing semantic data elements suitable to purchase line items (such as supplier, structured product attributes, and more). The outcome of such semantic hierarchical classification is a series of natural spend clusters 1106. In the case where an organization specific taxonomy 1124 is available, it is utilized to create an appropriate semantic structure that can be applied in the following steps including the step 1116 for grouping and/or filtering and/or applying categories to chosen natural spend clusters 1108 in an interactive visualization. In the case where an organization specific taxonomy is not available/present, the natural spend clusters are directly displayed in an interactive visualization. Visualizations known as treemaps, or similar hierarchical data visualizations could be useful for this, and may provide for the ability for the user to interactively control and group what data slices are shown, and for the user to interactively be able to manipulate the content of the visualization directly—an example visualization is shown in FIG. 10. For instance, in the bottom-left of FIG. 10, the user might right-click on a natural spend cluster and get a menu of actions to rename, combine, delete, edit or assign a taxonomy category to the cluster, such as the menu 1110 shown in FIG. 11. Similarly, in FIG. 10, user might be able to drag a given cluster and drop it on another cluster to initiate the act of combining clusters. The interactive visualization will automatically morph to reflect the actions taken by the user. Each such interactive step taken by the user is appropriately recorded as organization-specific training data behind the scenes, which is then used to generate organization-specific spend classifiers.

Another element that may be present in some embodiments supporting this type of interactive approach is a feedback loop back into the Item Master Database to record purchase signals, spend vocabulary and other useful signals. Specifically, given that the dataset being analyzed is purchase data from a given organization, and the processing is occurring at the purchase line item level of detail, the system is now aware of additional signals of purchase of specific products, from specific suppliers, at specific timeframes, in specific regions, at specific prices and more. All these are considered "purchase signals" which are fed back into the Item Master Database through this process, thereby enriching it. Another specific aspect of this process is that organization-specific taxonomies represent a custom semantic vocabulary 1126 to refer to products and groups of products. This is very useful data which is fed back into the Item Master Database through this process, thereby enhancing the vocabulary through which products and product groups are referenced, which in turn, enables the Item Master Database to become an adaptable source of semantic knowledge around products.

In embodiments where a visual spend map tool is present, once its data is available (e.g., after a cleaning and normalization process as described above), it will preferably provide that data into a hierarchical clustering engine, along with a label exclusion dictionary (e.g., an indication of topic or theme labels that are of no interest, such as colors, units of measure and similar common words), and any settings which may have been gathered based on experimentation with the engine. The hierarchical clustering engine could then prepare an index that would treat each purchase as a single document and go through a pipeline of analysis to enable identification of naturally occurring clusters of purchases and identification of suitable category or subcategory labels. Preferably (though not necessarily) this will be done organically rather than relying on external taxonomies or ontologies. In some embodiments, after clustering, the results can be placed in a visual interface that may provide features such as instant visualization of spend, interactive filtering and drill down, interactive category elimination, merging and relabeling, and interactive category assignment to customer taxonomy/provider taxonomy/UNSPSC taxonomy. In such a case, interactions may also be persisted to create a customer centric view of a spend map, and data elements from interactions may also be preserved to drive training data to prepare suitable classifiers for customer use. This type of training data may also be preserved and extracted to push into customer non-specific machine learning processes.

To illustrate how this type of functionality may operate in practice, consider FIGS. 9 and 10. FIG. 9 provides an example of purchase order line items such as might be included in data from an electronic procurement system and imported into a visualization tool as described above. Preferably, when such information is imported, each line would be analyzed with natural language analysis methods (e.g., part of speech analysis, noun and noun phrase identifications, etc.) to extract brand, product type, attributes, UOM, etc. from it, thereby providing a more refined, semi-structured view into an unstructured line item that would be more suitable for provision to a clustering engine. FIG. 10 provides an example of a visualization in the form of a hierarchical treemap. As shown in FIG. 10, in such a map, each cluster can be represented by a rectangle, such as 1002 for tissue and 1004 for facial tissue, and can correspond to a naturally occurring spend category, mined from the bottom up from available purchase data. Preferably, this will not require any knowledge of the organization's spend taxonomy or building a spend classifier in advance. That said, in some embodiments, visualization can use spend taxonomy information to combine with naturally occurring spend categories and can be interacted with to generate organization-specific spend classifiers as well.

In a visualization such as depicted in FIG. 10, size of cluster may be based on spend amounts in the cluster (which, in turn, could be determined as the aggregate of spend amount of individual purchases in the cluster). Alternatively, in some embodiments cluster size may represent number of items purchased. A visualization may include colors representing commodity types and/or other configured or user selected variable such as on/off contract spend, geographic location, supplier, relative spend velocity, and other such options. Preferably, users will be able to group or organize by natural spend categories as shown in FIG. 10, by an organization's spend taxonomy (if available), by UNSPSC or other industry classification, as well as by region and/or other metadata attributes. In some embodiments, a set of filters and search may be provided to narrow down a spend map to view a given criteria (e.g., Select one or more categories; OR Select one or more suppliers; OR Select region(s); OR combination). Also, in some cases a visualization may be interactive allowing a user to perform actions such as:

Select a cluster and remove it (label may be added to Customer-specific Label Exclusion dictionary, and applied, and viz refreshed)

Select a cluster and another one or more and combine them (Example: Select "Jewelry Box 3.5×3" and "Jewelry Box 3.5×3.5" and combine them)

Select a cluster and assign a different label

Select a cluster and assign to a taxonomy node

Ability to group clusters by taxonomy, by region etc.

Preferably, in embodiments where they are supported, interactions such as described above will immediately change the shape of a spend map visualization.

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 16:
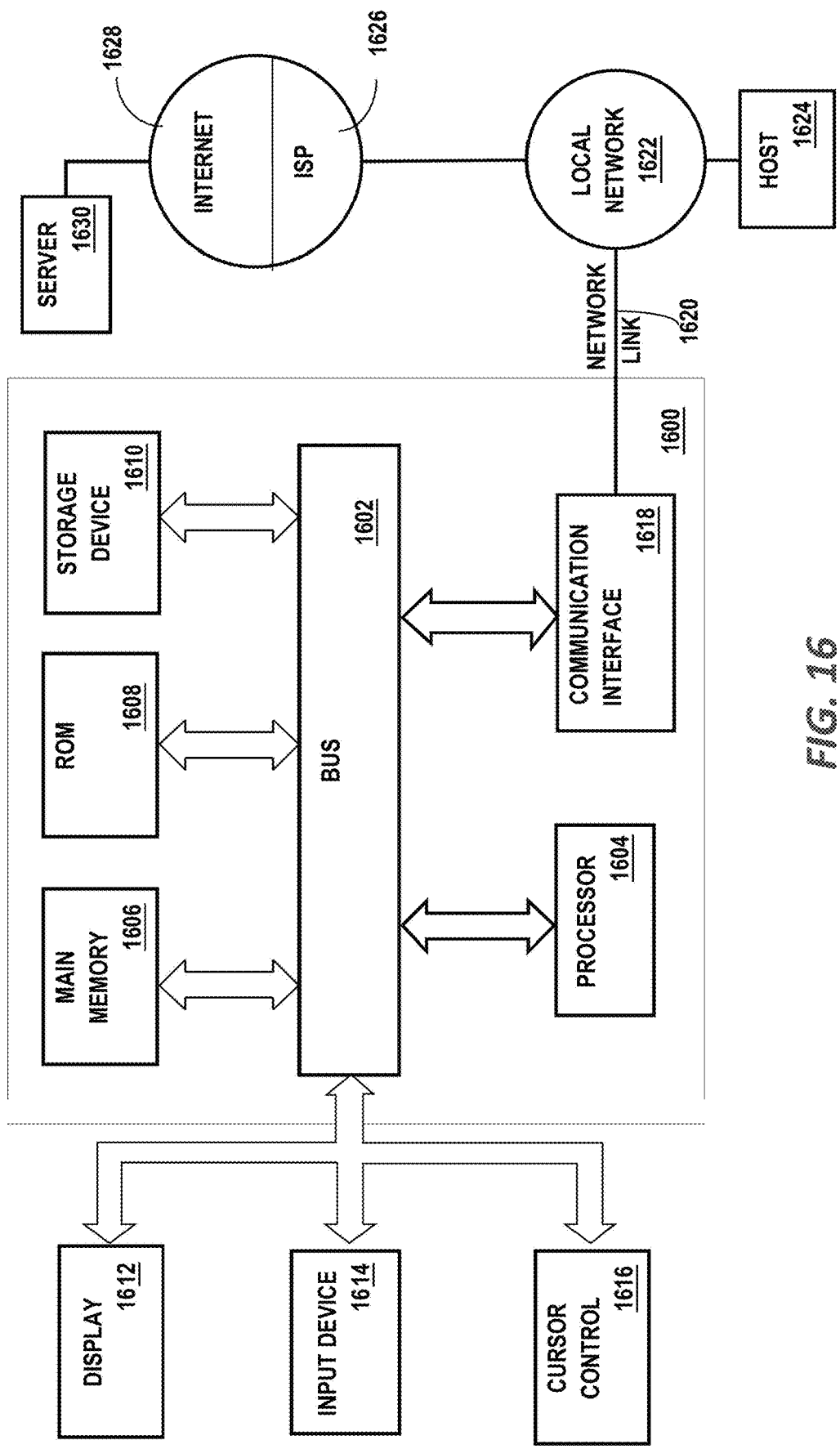
FIG. 16 is a block diagram that illustrates a computer system upon which an embodiment of the invention may be implemented.

FIG. 16 is a block diagram that illustrates an example computer system with which an embodiment may be implemented. In the example of FIG. 16, a computer system 1600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 1600 includes an input/output (I/O) subsystem 1602 which may include a bus and/or other communication mechanism(s) for communicating information and/or instructions between the components of the computer system 1600 over electronic signal paths. The I/O subsystem 1602 may include an I/O controller, a memory controller and at least one I/O port. The electronic signal paths are represented schematically in the drawings, for example as lines, unidirectional arrows, or bidirectional arrows.

At least one hardware processor 1604 is coupled to I/O subsystem 1602 for processing information and instructions. Hardware processor 1604 may include, for example, a general-purpose microprocessor or microcontroller and/or a special-purpose microprocessor such as an embedded system or a graphics processing unit (GPU) or a digital signal processor or ARM processor. Processor 1604 may comprise an integrated arithmetic logic unit (ALU) or may be coupled to a separate ALU.

Computer system 1600 includes one or more units of memory 1606, such as a main memory, which is coupled to I/O subsystem 1602 for electronically digitally storing data and instructions to be executed by processor 1604. Memory 1606 may include volatile memory such as various forms of random-access memory (RAM) or other dynamic storage device. Memory 1606 also may be used for storing temporary variables or other intermediate information during execution of instructions to be executed by processor 1604. Such instructions, when stored in non-transitory computer-readable storage media accessible to processor 1604, can render computer system 1600 into a special-purpose machine that is customized to perform the operations specified in the instructions.

Computer system 1600 further includes non-volatile memory such as read only memory (ROM) 1608 or other static storage device coupled to I/O subsystem 1602 for storing information and instructions for processor 1604. The ROM 1608 may include various forms of programmable ROM (PROM) such as erasable PROM (EPROM) or electrically erasable PROM (EEPROM). A unit of persistent storage 1610 may include various forms of non-volatile RAM (NVRAM), such as FLASH memory, or solid-state storage, magnetic disk, or optical disk such as CD-ROM or DVD-ROM and may be coupled to I/O subsystem 1602 for storing information and instructions. Storage 1610 is an example of a non-transitory computer-readable medium that may be used to store instructions and data which when executed by the processor 1604 cause performing computer-implemented methods to execute the techniques herein.

The instructions in memory 1606, ROM 1608 or storage 1610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 1600 may be coupled via I/O subsystem 1602 to at least one output device 1612. In one embodiment, output device 1612 is a digital computer display. Examples of a display that may be used in various embodiments include a touch screen display or a light-emitting diode (LED) display or a liquid crystal display (LCD) or an e-paper display. Computer system 1600 may include other type(s) of output devices 1612, alternatively or in addition to a display device. Examples of other output devices 1612 include printers, ticket printers, plotters, projectors, sound cards or video cards, speakers, buzzers or piezoelectric devices or other audible devices, lamps or LED or LCD indicators, haptic devices, actuators, or servos.

At least one input device 1614 is coupled to I/O subsystem 1602 for communicating signals, data, command selections or gestures to processor 1604. Examples of input devices 1614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 1616, which may perform cursor control or other automated control functions such as navigation in a graphical interface on a display screen, alternatively or in addition to input functions. Control device 1616 may be a touchpad, a mouse, a trackball, or cursor direction keys for communicating direction information and command selections to processor 1604 and for controlling cursor movement on display 1612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 1614 may include a combination of multiple different input devices, such as a video camera and a depth sensor.

In another embodiment, computer system 1600 may comprise an internet of things (IoT) device in which one or more of the output device 1612, input device 1614, and control device 1616 are omitted. Or, in such an embodiment, the input device 1614 may comprise one or more cameras, motion detectors, thermometers, microphones, seismic detectors, other sensors or detectors, measurement devices or encoders and the output device 1612 may comprise a special-purpose display such as a single-line LED or LCD display, one or more indicators, a display panel, a meter, a valve, a solenoid, an actuator or a servo.

When computer system 1600 is a mobile computing device, input device 1614 may comprise a global positioning system (GPS) receiver coupled to a GPS module that is capable of triangulating to a plurality of GPS satellites, determining and generating geo-location or position data such as latitude-longitude values for a geophysical location of the computer system 1600. Output device 1612 may include hardware, software, firmware and interfaces for generating position reporting packets, notifications, pulse or heartbeat signals, or other recurring data transmissions that specify a position of the computer system 1600, alone or in combination with other application-specific data, directed toward host 1624 or server 1630.

Computer system 1600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 1600 in response to processor 1604 executing at least one sequence of at least one instruction contained in main memory 1606. Such instructions may be read into main memory 1606 from another storage medium, such as storage 1610. Execution of the sequences of instructions contained in main memory 1606 causes processor 1604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 1610. Volatile media includes dynamic memory, such as memory 1606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 1602. Transmission media can also take the form of acoustic or light waves, such as those generated during radio-wave and infra-red data communications.

Various forms of media may be involved in carrying at least one sequence of at least one instruction to processor 1604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 1600 can receive the data on the communication link and convert the data to be read by computer system 1600. For instance, a receiver such as a radio frequency antenna or an infrared detector can receive the data carried in a wireless or optical signal and appropriate circuitry can provide the data to I/O subsystem 1602 such as place the data on a bus. I/O subsystem 1602 carries the data to memory 1606, from which processor 1604 retrieves and executes the instructions. The instructions received by memory 1606 may optionally be stored on storage 1610 either before or after execution by processor 1604.

Computer system 1600 also includes a communication interface 1618 coupled to bus 1602. Communication interface 1618 provides a two-way data communication coupling to network link(s) 1620 that are directly or indirectly connected to at least one communication networks, such as a network 1622 or a public or private cloud on the Internet. For example, communication interface 1618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 1622 broadly represents a local area network (LAN), wide-area network (WAN), campus network, internetwork, or any combination thereof. Communication interface 1618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 1618 sends and receives electrical, electromagnetic, or optical signals over signal paths that carry digital data streams representing various types of information.

Network link 1620 typically provides electrical, electromagnetic, or optical data communication directly or through at least one network to other data devices, using, for example, satellite, cellular, Wi-Fi, or BLUETOOTH technology. For example, network link 1620 may provide a connection through a network 1622 to a host computer 1624.

Furthermore, network link 1620 may provide a connection through network 1622 or to other computing devices via internetworking devices and/or computers that are operated by an Internet Service Provider (ISP) 1626. ISP 1626 provides data communication services through a world-wide packet data communication network represented as internet 1628. A server computer 1630 may be coupled to internet 1628. Server 1630 broadly represents any computer, data center, virtual machine, or virtual computing instance with or without a hypervisor, or computer executing a containerized program system such as DOCKER or KUBERNETES. Server 1630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 1600 and server 1630 may form elements of a distributed computing system that includes other computers, a processing cluster, server farm or other organization of computers that cooperate to perform tasks or execute applications or services. Server 1630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 1630 may comprise a web application server that hosts a presentation layer, application layer and data storage layer such as a relational database system using structured query language (SQL) or no SQL, an object store, a graph database, a flat file system or other data storage.

Computer system 1600 can send messages and receive data and instructions, including program code, through the network(s), network link 1620 and communication interface 1618. In the Internet example, a server 1630 might transmit a requested code for an application program through Internet 1628, ISP 1626, local network 1622 and communication interface 1618. The received code may be executed by processor 1604 as it is received, and/or stored in storage 1610, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 1604. While each processor 1604 or core of the processor executes a single task at a time, computer system 1600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method comprising:
obtaining, via upload to a computer system or from live data sources, a plurality of unstructured purchase data having as mandatory fields only line item title, date, and spend amount, the plurality of unstructured purchase data being related to purchases of a plurality of items in a plurality of commodity groups and offered by a plurality of suppliers;

for each purchase line item represented in the plurality of unstructured purchase data, the computer system executing: determining a plurality of field-level data quality scores for a plurality of data fields in each purchase line item; weighting the plurality of field-level data quality scores; determining a row-level quality score based on a sum of the weighted field-level data quality scores; based on the row-level quality score, enriching the each purchase line item in the plurality of unstructured purchase data based on product details and attributes obtained from an item master database, to form an enriched purchase dataset;

processing the enriched purchase dataset using a hierarchical classifier using additional semantic data elements to output a series of natural spend clusters corresponding to product categories represented in the enriched purchase dataset;

displaying on a graphical user interface of a computer display device each of the natural spend clusters in a treemap visualization in which each of the natural spend clusters is a first rectangle corresponding to a product category and a plurality of second rectangles corresponding to subcategories of the product category, each of the second rectangles having a size corresponding to an aggregated spend amount of individual purchases of a corresponding subcategory or a number of items purchased;

in response to a first user input via a control device to select a particular cluster in the treemap visualization and to drag the particular cluster to another cluster, combining the particular cluster and another cluster, and automatically morphing the treemap visualization to reflect the combining.

2. The computer-implemented method of claim 1, further comprising, in response to a second user input via the control device to select the particular cluster in the treemap visualization, causing displaying, in the treemap visualization, a graphical menu of actions that are programmed to rename, delete, edit or assign a taxonomy category to the particular cluster.

3. The computer-implemented method of claim 2, further comprising recording, in association with the hierarchical classifier, the first user input and the second user input as organization-specific training data for the hierarchical classifier.

4. The computer-implemented method of claim 1, the processing using the hierarchical classifier further comprising:

processing the enriched purchase dataset using natural language analysis to extract brand, product type, and attributes to form semi-structured product line items;

providing the semi-structured product line items and a label exclusion dictionary to a hierarchical clustering engine, the hierarchical clustering engine being programmed to prepare an index of each purchase line item in the plurality of unstructured purchase data and to identify clusters of purchases represented in the enriched purchase dataset and category labels for the clusters of purchases.

5. The computer-implemented method of claim 1, further comprising processing the enriched purchase dataset using the hierarchical classifier using the additional semantic data elements to output the series of the natural spend clusters that represent aggregate spending amount of individual purchases in the product categories represented in the enriched purchase dataset, an organization spend taxonomy not being available.

6. The computer-implemented method of claim 1, further comprising processing the enriched purchase dataset using the hierarchical classifier using the additional semantic data elements to output the series of the natural spend clusters that represent aggregate numbers of items purchased of individual purchases in the product categories represented in the enriched purchase dataset, an organization spend taxonomy not being available.

7. The computer-implemented method of claim 1, further comprising causing displaying the treemap visualization using a different color in a treemap of the treemap visualization for each commodity type represented in the treemap visualization.

8. One or more computer-readable non-transitory storage media storing one or more sequences of stored program instructions which, when executed using a computer system, cause the computer system to:

obtain, via upload to the computer system or from live data sources, a plurality of unstructured purchase data having as mandatory fields only line item title, date, and spend amount, the plurality of unstructured purchase data being related to purchases of a plurality of items in a plurality of commodity groups and offered by a plurality of suppliers;

for each purchase line item represented in the plurality of unstructured purchase data, the computer system executing: determine a plurality of field-level data quality scores for a plurality of data fields in each purchase line item; weight the plurality of field-level data quality scores; determine a row-level quality score based on a sum of the weighted field-level data quality scores; based on the row-level quality score, enrich the each purchase line item in the plurality of unstructured purchase data based on product attributes obtained from an item master database, to form an enriched purchase dataset;

process the enriched purchase dataset using a hierarchical classifier using additional semantic data elements to output a series of natural spend clusters corresponding to product categories represented in the enriched purchase dataset;

displaying on a graphical user interface of a computer display device each of the natural spend clusters in a treemap visualization in which each of the natural spend clusters is a first rectangle corresponding to a product category and a plurality of second rectangles corresponding to subcategories of the product category, each of the second rectangles having a size corresponding to an aggregated spend amount of individual purchases of a corresponding subcategory or a number of items purchased;

in response to a first user input via a control device to select a particular cluster in the treemap visualization and to drag the particular cluster to another cluster, combine the particular cluster and another cluster, and automatically morph the treemap visualization to reflect the combining.

9. The one or more computer-readable non-transitory storage media of claim 8, further comprising sequences of stored program instructions which, when executed using the computer system, cause the computer system to execute, in response to a second user input via the control device to select the particular cluster in the treemap visualization, cause displaying, in the treemap visualization, a graphical menu of actions that are programmed to rename, delete, edit or assign a taxonomy category to the particular cluster.

10. The one or more computer-readable non-transitory storage media of claim 9, further comprising sequences of stored program instructions which, when executed using the computer system, cause the computer system to record, in association with the hierarchical classifier, the first user input and the second user input as organization-specific training data for the hierarchical classifier.

11. The one or more computer-readable non-transitory storage media of claim 8, further comprising sequences of stored program instructions which, when executed using the computer system, cause the computer system to:
  process the enriched purchase dataset using natural language analysis to extract brand, product type, and attributes to form semi-structured product line items;
  provide the semi-structured product line items and a label exclusion dictionary to a hierarchical clustering engine, the hierarchical clustering engine being programmed to prepare an index of each purchase line item in the plurality of unstructured purchase data and to identify clusters of purchases represented in the enriched purchase dataset and category labels for the clusters of purchases.

12. The one or more computer-readable non-transitory storage media of claim 8, further comprising sequences of stored program instructions which, when executed using the computer system, cause the computer system to process the enriched purchase dataset using the hierarchical classifier using the additional semantic data elements to output the series of the natural spend clusters that represent aggregate spending amount of individual purchases in the product categories represented in the enriched purchase dataset, an organization spend taxonomy not being available.

13. The one or more computer-readable non-transitory storage media of claim 8, further comprising sequences of stored program instructions which, when executed using the computer system, cause the computer system to process the enriched purchase dataset using the hierarchical classifier using the additional semantic data elements to output the series of the natural spend clusters that represent aggregate numbers of items purchased of individual purchases in the product categories represented in the enriched purchase dataset, an organization spend taxonomy not being available.

14. The one or more computer-readable non-transitory storage media of claim 8, further comprising sequences of stored program instructions which, when executed using the computer system, cause the computer system to cause displaying the treemap visualization using a different color in a treemap of the treemap visualization for each commodity type represented in the treemap visualization.

* * * * *